US012774001B2

(12) United States Patent
Suzuki et al.

(10) Patent No.: US 12,774,001 B2
(45) Date of Patent: Oct. 27, 2026

(54) DRIVING ASSISTANCE DEVICE, DRIVING ASSISTANCE METHOD, AND DRIVING ASSISTANCE PROGRAM

(71) Applicant: PIONEER CORPORATION, Tokyo (JP)

(72) Inventors: Yasunori Suzuki, Saitama (JP); Akira Shimizu, Saitama (JP); Yasuo Shirosaki, Saitama (JP); Yoshiki Miura, Saitama (JP); Norihiko Fukushima, Saitama (JP); Takanori Sudo, Saitama (JP); Isao Takahashi, Saitama (JP)

(73) Assignee: PIONEER CORPORATION, Tokyo (JP)

( * ) Notice: Subject to any disclaimer, the term of this patent is extended or adjusted under 35 U.S.C. 154(b) by 305 days.

(21) Appl. No.: 18/264,519

(22) PCT Filed: Feb. 18, 2021

(86) PCT No.: PCT/JP2021/006224
§ 371 (c)(1),
(2) Date: Aug. 7, 2023

(87) PCT Pub. No.: WO2022/176135
PCT Pub. Date: Aug. 25, 2022

(65) Prior Publication Data

US 2024/0101127 A1 Mar. 28, 2024

(51) Int. Cl.

*B60W 40/13* (2012.01)
*B60W 50/14* (2020.01)
*G01P 15/18* (2013.01)

(52) U.S. Cl.
CPC ............ *B60W 40/13* (2013.01); *B60W 50/14* (2013.01); *G01P 15/18* (2013.01); *B60W 2520/125* (2013.01)

(58) Field of Classification Search
CPC ................. B60W 40/13; B60W 50/14; B60W 2520/125; G01P 15/18
See application file for complete search history.

(56) References Cited

U.S. PATENT DOCUMENTS

2009/0138191 A1* 5/2009 Engelhard ............. B60W 40/13 340/440
2010/0171628 A1* 7/2010 Stansfield .......... G08B 13/1436 340/669
(Continued)

FOREIGN PATENT DOCUMENTS

JP 2005-014828 A 1/2005
JP 2014-088058 A 10/2012
(Continued)

OTHER PUBLICATIONS

Patent Cooperation Treaty, International Search Report, Application No. PCT/JP2021/006224, dated Apr. 27, 2021, in 7 pages.
(Continued)

*Primary Examiner* — Adam M Alharbi
(74) *Attorney, Agent, or Firm* — Procopio, Cory, Hargreaves & Savitch LLP

(57) ABSTRACT

A driving assistance device includes a memory and a processor. The processor acquires travel information including acceleration of a moving body. The processor presents, to the moving body, information regarding cargo collapse on the moving body that is specified on the basis of a distribution of the acceleration of the moving body in multiple axes on the basis of the travel information.

8 Claims, 7 Drawing Sheets

(56) References Cited

U.S. PATENT DOCUMENTS

| | | | |
|---|---|---|---|
| 2014/0067313 | A1 | 3/2014 | Breed |
| 2017/0050599 | A1 * | 2/2017 | Gilbert .............. B60R 21/01332 |
| 2020/0319638 | A1 * | 10/2020 | Bowen ................. G05D 1/0257 |
| 2022/0189304 | A1 | 6/2022 | Fujita et al. |
| 2023/0273065 | A1 * | 8/2023 | Sellhusen ................. B60P 7/06 701/29.1 |

FOREIGN PATENT DOCUMENTS

| | | | |
|---|---|---|---|
| JP | 2012-224270 | A | 11/2012 |
| JP | 2012-236490 | A | 12/2012 |
| JP | 2020-0166755 | A | 10/2020 |
| WO | 2013100275 | A1 | 7/2013 |

OTHER PUBLICATIONS

Office Action received in JP2023-500248, dated May 28, 2024, in 3 pages (with translation).

Office Action dated Aug. 19, 2025 in Japanese Patent Application 2024-157918, 4 pages.

* cited by examiner

DRIVING ASSISTANCE DEVICE, DRIVING ASSISTANCE METHOD, AND DRIVING ASSISTANCE PROGRAM

CROSS-REFERENCE TO RELATED APPLICATIONS

This application is national stage application of International Application No. PCT/JP2021/006224, filed on Feb. 18, 2021, which designates the United States, incorporated herein by reference, and which claims the benefit of priority therefrom, the entire contents of which are incorporated herein by reference.

TECHNICAL FIELD

The present invention relates to a driving assistance device, a driving assistance method, and a driving assistance program.

BACKGROUND ART

Conventionally, there has been known a technique to predict the collapse of cargo loaded on a cargo bed of a traveling vehicle by acquiring information such as acceleration of the vehicle (for example, see Patent Document 1).

PRIOR ART DOCUMENTS

Patent Literature

Patent Document 1: JP 2012-224270 A

SUMMARY OF THE INVENTION

Problem to be Solved by the Invention

However, in the conventional technique described above, there is room for further improvement in reducing the cargo collapse on the vehicle since there is room for improvement in a prediction accuracy of cargo collapse.

The present invention has been made in view of the above, and an object thereof is to provide a driving assistance device, a driving assistance method, and a driving assistance program capable of reducing the cargo collapse, for example.

Means for Solving the Problem

A driving assistance device according to claim 1 includes an acquisition means and a presentation means. The presentation means acquires travel information including acceleration of a moving body. The presentation means presents, to a driver, information regarding cargo collapse on the moving body specified on the basis of a distribution of the acceleration of the moving body in multiple axes on the basis of the travel information acquired by the acquisition means.

Further, a driving assistance method according to an exemplary embodiment is a driving assistance method to be executed by the driving assistance device, the driving assistance method acquiring travel information including acceleration of a moving body, and presenting, to a driver, information regarding cargo collapse on the moving body specified on the basis of a distribution of the acceleration of the moving body in multiple axes on the basis of the acquired travel information.

Further, a driving assistance program according to an exemplary embodiment acquires travel information including acceleration of a moving body, and causes a computer to execute a process to present, to a driver, information regarding cargo collapse on the moving body specified on the basis of a distribution of the acceleration of the moving body in multiple axes on the basis of the acquired travel information.

DESCRIPTION OF EMBODIMENTS

Figure 1:
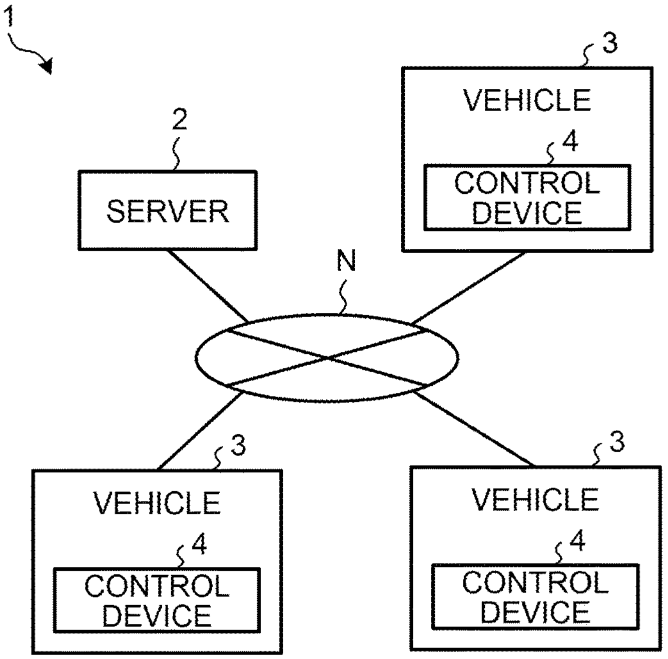
FIG. 1 is an explanatory drawing showing an example of a configuration of a control system according to the embodiment 1.

With reference to the drawings, the following describes embodiments for carrying out the present invention (hereinafter referred to as embodiment). The present invention is not limited to the embodiments described below. Further, the same numbers and signs are assigned to identical parts in the drawings.

<Configuration of Control System>

First, a configuration of a control system 1 according to the embodiment 1 will be described with reference to FIG. 1. FIG. 1 is an explanatory drawing showing an example of a configuration of the control system 1 according to the embodiment 1. As shown in FIG. 1, the control system 1 according to the embodiment 1 includes a server 2 and a plurality of vehicles 3. A vehicle 3 is an example of a moving body.

The server 2 controls the plurality of vehicles 3 as a control network. Each of the plurality of vehicles 3 includes a corresponding control device 4.

These server 2 and the plurality of vehicles 3 are connected to each other via a network (for example, Internet) N by, for example, a wireless Local Area Network (LAN) communication, or a Wide Area Network (WAN) communication, and a mobile phone communication or the like, and communication of various information is possible therebetween.

<Configuration of Server>

Figure 2:
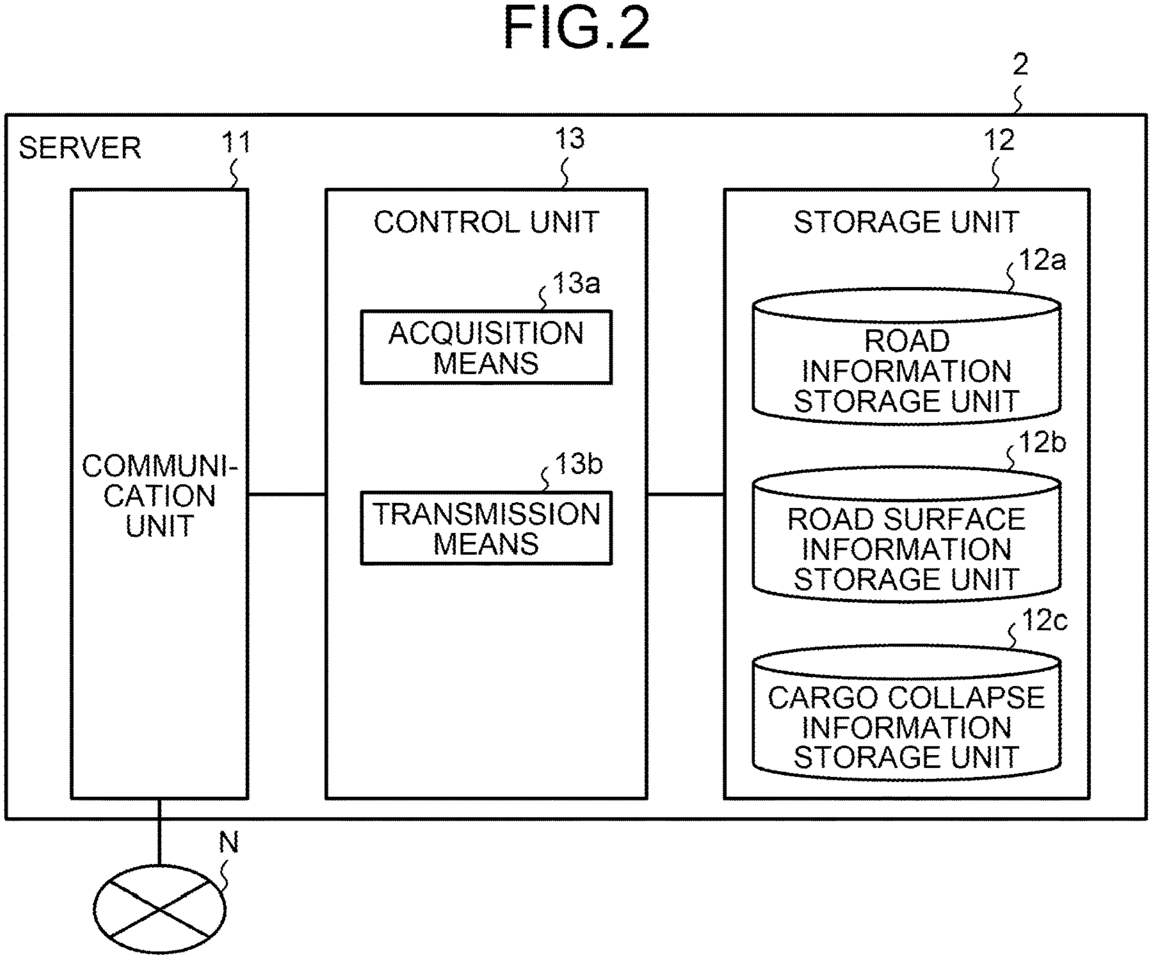
FIG. 2 is an explanatory drawing showing an example of a configuration of a server according to the embodiment 1.

Next, a configuration of the server 2 according to the embodiment 1 will be described with reference to FIG. 2. FIG. 2 is the explanatory drawing showing an example of a configuration of the server 2 according to the embodiment 1. As shown in FIG. 2, the server 2 includes a communication unit 11, a storage unit 12, and a control unit 13.

Note that, the server 2 may include an input unit (for example, keyboard or mouse or the like) that accepts various operations from a manager or the like who uses the server 2, and a display unit (for example, liquid crystal display or the like) to display the various kinds of information.

The communication unit 11 is implemented by, for example, a Network Interface Card (NIC) or the like. The communication unit 11 is connected to the network N in a wired or wireless manner, and further performs transmission and reception of information between the communication unit 11 and the plurality of vehicles 3.

The storage unit 12 is implemented by, for example, a semiconductor memory element such as a Random Access Memory (RAM), a Flash Memory, or the like, or a storage device such as a hard disk, an optical disk, or the like. As shown in FIG. 2, the storage unit 12 includes a road information storage unit 12*a*, a road surface information storage unit 12*b*, and a cargo collapse information storage unit 12*c*.

The road information storage unit 12*a* stores road position information that indicates a position of the road, such as map information. The road surface information storage unit 12*b* stores therein information regarding a road surface condition of the road (hereinafter also referred to as "road surface information"). The road surface information storage unit 12*b* stores therein, for example, information regarding a position of a road surface at which a road-surface roughness exists, and information regarding details of the road-surface roughness (for example, shape or the like) that is associated with information regarding the position of the road surface.

The cargo collapse information storage unit 12*c* stores therein information regarding cargo collapse on the vehicle 3 (hereinafter also referred to as cargo collapse information). The cargo collapse information storage unit 12*c* sores therein, for example, information regarding a position at which a degree of an influence given to the cargo collapse is large, and information regarding a degree of an influence given to the cargo collapse that is associated with information regarding the position of the large influence.

The control unit 13 may be a controller to be realized in a case where various programs stored in the storage device inside the server 2 are executed by, for example, a Central Processing Unit (CPU) or a Micro Processing Unit) MPU), having the RAM as a working area. Further, the control unit 13 may be, for example, a controller to be realized by an integrated circuit such as an Application Specific Integrated Circuit (ASIC) or a Field Programmable Gate Array (FPGA), or the like.

As shown in FIG. 2, the control unit 13 includes an acquisition means 13*a* and a transmission means 13*b*, and implements or executes functions and operations of various processes to be explained below. Note that, an internal configuration of the control unit 13 is not limited to the configuration shown in FIG. 2, and may be another configuration as long as the configuration executes various processes to be described later.

The acquisition means 13*a* acquires the road surface information that is estimated by the control device 4 of the vehicle 3 and transmitted from the control device 4, and stores the road surface information in the road surface information storage unit 12*b*. Further, the acquisition means 13*a* acquires the cargo collapse information that is identified by the control device 4 of the vehicle 3 and transmitted from the control device 4, and stores the cargo collapse information in the cargo collapse information storage unit 12*c*.

The transmission means 13*b* transmits the road surface information stored in the road surface information storage unit 12*b* and the cargo collapse information stored in the cargo collapse information storage unit 12*c* on the basis of a command from the control device 4 of the vehicle 3.

<Road Surface Condition Estimation Process>

Figure 3:
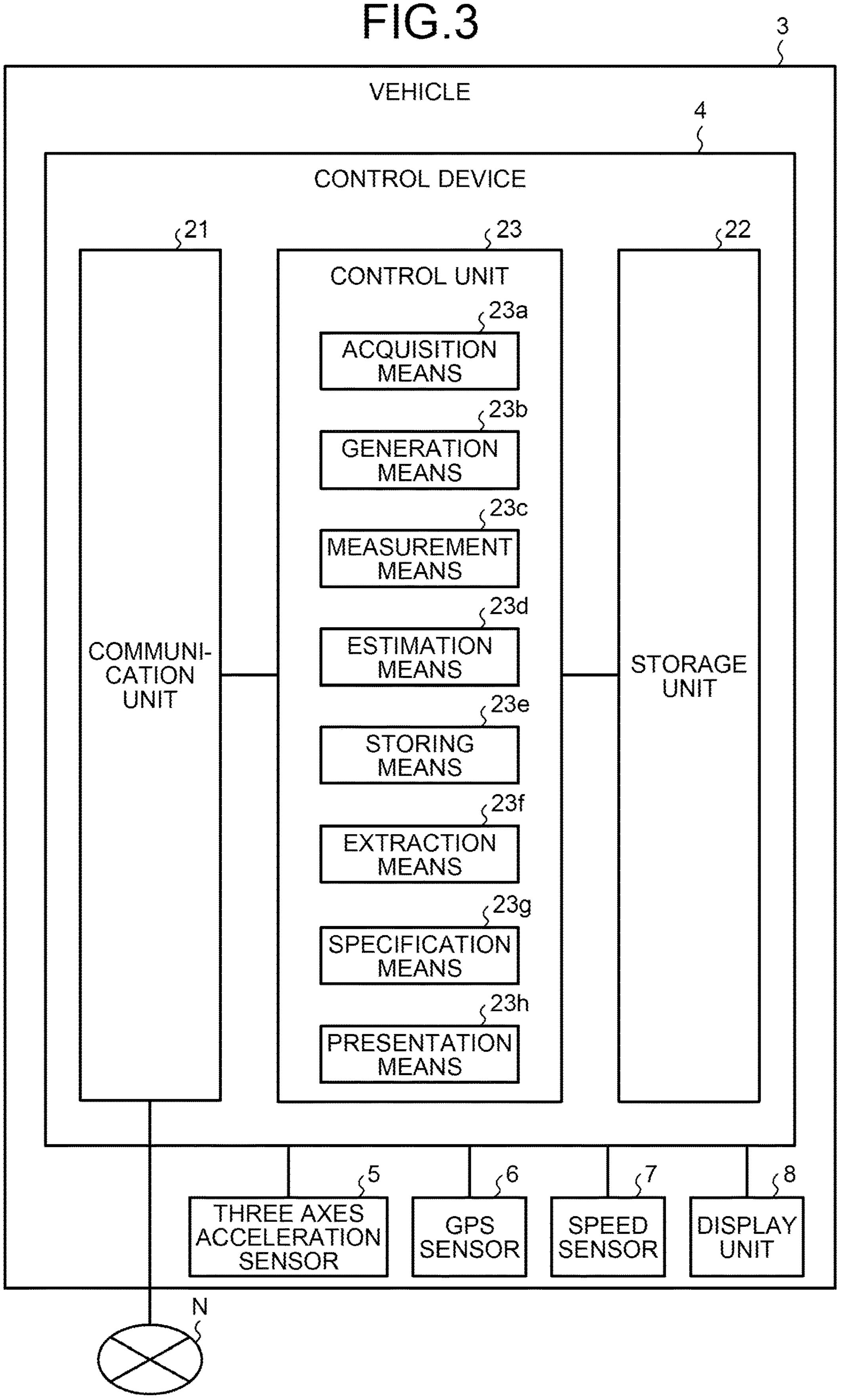
FIG. 3 is an explanatory drawing showing an example of a configuration of a vehicle according to the embodiment 1.

Next, details of a configuration of the vehicle 3 and a road surface condition estimation process to be implemented in the vehicle 3 according to the embodiment 1 are explained with reference to FIGS. 3 to 6. FIG. 3 is an explanatory drawing showing an example of the configuration of the vehicle 3 according to the embodiment 1.

As shown in FIG. 3, the vehicle 3 includes the control device 4, a three axes acceleration sensor 5, a Global Positioning System (GPS) sensor 6, a speed sensor 7, and a display unit 8. The control device 4 is an example of a road surface condition estimation device, and an example of a driving assistance device.

The three axes acceleration sensor 5 is a sensor to detect acceleration in respective directions in, for example, the X axis (for example, front-back direction of vehicle 3), the Y axis (for example, lateral direction of vehicle 3), and the Z axis (for example, vertical direction of vehicle 3), and supplies a detected signal thereof to the control device 4. Note that the three axes acceleration sensor 5 may further detect angular velocity, angular acceleration and the like of an operation of the vehicle 3.

The GPS sensor 6 receives radio waves carrying downlink data including measurement data, and supplies the measurement data to control device 4. The control device 4 is capable of detecting an absolute position of the vehicle 3 from positional information included in the measurement data (for example, latitude and longitude).

The speed sensor 7 is, for example, the sensor to detect speed of the vehicle 3, and supplies a detected signal thereof to the control device 4. The display unit 8 is provided in, for example, an instrumental panel of the vehicle 3, and includes a liquid crystal display, an organic Electro Luminescence (EL) element, and the like.

The control device 4 includes a communication unit 21, a storage unit 22, and a control unit 23. The communication unit 21 is implemented by, for example, the NIC or the like. The communication unit 21 is connected to the network N in a wired or wireless manner, and further performs the transmission and reception of information between the communication unit 21 and the server 2 via the network N.

The storage unit 22 is implemented by, for example, the semiconductor memory element such as the RAM, the Flash Memory, or the like, or the storage device such as the hard disk, the optical disk, or the like.

The control unit 23 may be a controller to be realized in a case where the various programs stored in the storage device inside the control device 4 are executed by, for example, the CPU or the MPU, having the RAM as the working area. Further, the control unit 23 may be, for example, a controller to be realized by the integrated circuit such as the ASIC or the FPGA or the like.

As shown in FIG. 3, the control unit 23 includes an acquisition means 23*a*, a generation means 23*b*, a measurement means 23*c*, an estimation means 23*d*, a storing means 23*e*, an extraction means 23*f*, a specification means 23*g*, and a presentation means 23*h*, and implements or executes functions and operations of various processes to be explained below. Note that, an internal configuration of the control unit 23 is not limited to a configuration shown in FIG. 3, and may be another configuration as long as the configuration executes various processes to be explained below.

The acquisition means 23*a* acquires information regarding travel of the vehicle 3 (hereinafter also referred to as travel information). As the travel information, the acquisition means 23*a* acquires, for example, information regarding acceleration in the front-back direction, the lateral direction, and the vertical direction of the vehicle 3 from the three axes acceleration sensor 5.

In addition, as the travel information, the acquisition means 23*a* acquires, for example, positional information of the vehicle 3 from the GPS sensor 6, and acquires speed information of the vehicle 3 from the speed sensor 7.

The generation means 23*b* generates an acceleration value distribution map that is a drawing in which a distribution of the acceleration in three axes in predetermined unit time is plotted in a three-dimensional coordinate system by using information regarding the acceleration of vehicle 3 in the front-back direction, the lateral direction, and the vertical direction acquired by the acquisition means 23*a*. Details of the acceleration value distribution map will be explained below.

Figure 4:
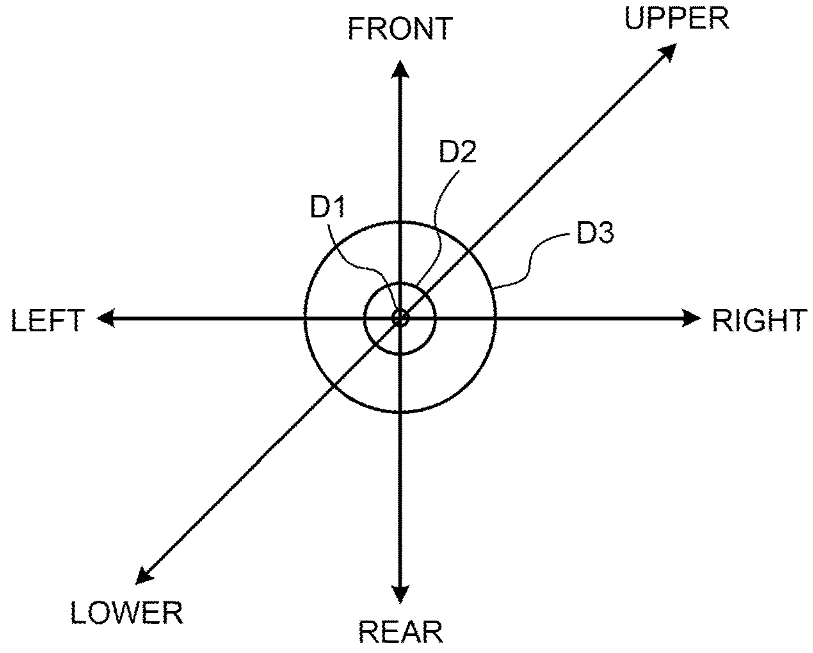
FIG. 4 is a drawing showing an example of an acceleration value distribution map according to the embodiment 1.

FIG. 4 is a drawing showing an example of the acceleration value distribution map according to the embodiment 1. For example, in a case where the vehicle 3 is stopped with its engine stopped, a plot range of the acceleration value distribution map becomes a plot range D1 in the vicinity of the origin of the three-dimensional coordinate system.

In addition, in a case where the vehicle 3 is stopped with its engine idling, the plot range of the acceleration value distribution map becomes a plot range D2 in a spherical shape which is broader than the above-mentioned plot range D1 setting the origin of the three-dimensional coordinate system as the center.

Further, in a case where the vehicle 3 is traveling on a plane road surface, the plot range of the acceleration value distribution map becomes a plot range D3 in the spherical shape which is broader than the above-mentioned plot range D2 setting the origin of the three-dimensional coordinate system as the center. Note that, in FIG. 4 and the text, an origin thereof is set on a point at which gravity acceleration is considered to the origin (initial value is set as 1 g in vertical direction).

Figure 5:
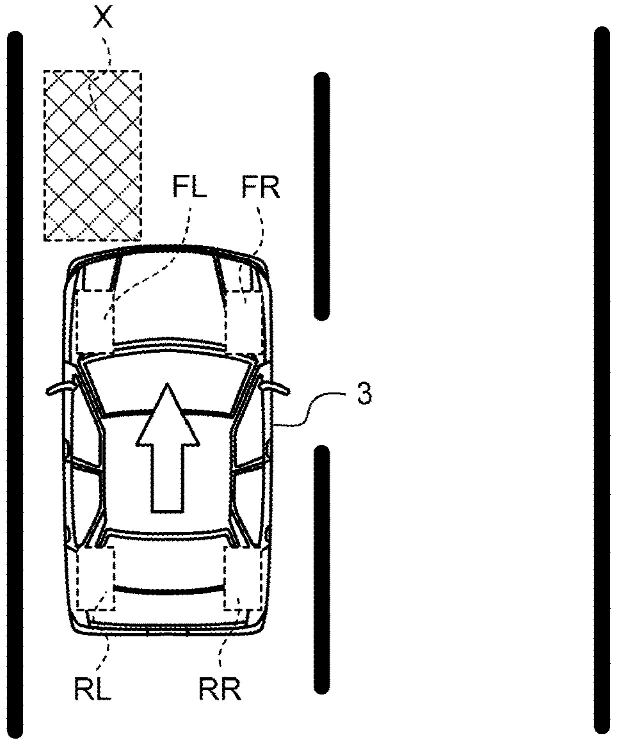
FIG. 5 is a drawing to explain an example of a road surface condition estimation process according to the embodiment 1.

Next, the road surface condition estimation process using the acceleration value distribution map will be explained. FIG. 5 is a drawing to explain an example of the road surface condition estimation process according to the embodiment 1. As shown in FIG. 5, it is assumed that the vehicle 3 passes a road surface deterioration section X where there are cracks of asphalt or the like.

In this case, since a right front wheel FR and a right rear wheel RR of the vehicle 3 do not pass the road surface deterioration section X while a left front wheel FL and a left rear wheel RL of the vehicle 3 pass the road surface deterioration section X in this order, the vehicle 3 is swayed in the front-back direction, and further is swayed more greatly in the left direction than in the right direction.

Figure 6:
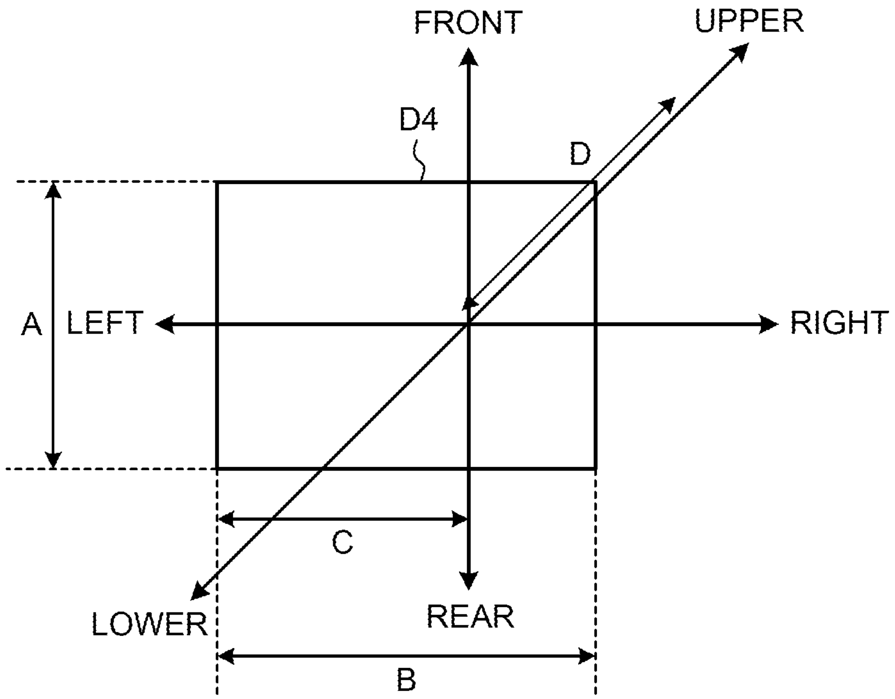
FIG. 6 is a drawing showing an example of an acceleration value distribution map according to the embodiment 1.

Then, in a unit time of passing through the road surface deterioration section X, the generation means 23*b* generates the acceleration value distribution map as shown in FIG. 6. FIG. 6 is a drawing showing an example of the acceleration value distribution map according to the embodiment 1.

In the unit time of passing through the road surface deterioration section X is, as shown in FIG. 6, the generation means 23*b* generates the acceleration value distribution map of a plot range D4 which spreads in the front-back direction and the vertical direction and spreads wider in the left direction than in the right direction.

Returning to description of FIG. 3. The measurement means 23*c* of the control unit 23 measures information regarding vibration of the vehicle 3 (hereinafter also referred to as vibration information) on the basis of a distribution of the acceleration of the vehicle 3 in multiple axes (for example, acceleration value distribution map generated by generation means 23*b*).

The vibration information measured by the measurement means 23*c* may be, for example, an absolute value |A| of a size in the front-back direction in the acceleration value distribution map of the plot range D4 shown in FIG. 6. In addition, the vibration information measured by the measurement means 23*c* may be, for example, an absolute value |B| of a size in the lateral direction in the acceleration value distribution map of the plot range D4.

Further, the vibration information measured by the measurement means 23*c* may be, for example, an absolute value |B/C| of a ratio of a size B in the lateral direction in the acceleration value distribution map of the plot range D4 to a size C that spreads wider in the horizontal direction (left direction in drawing) with the origin set as reference.

Further, the vibration information measured by the measurement means 23*c* may be, for example, an absolute value |D| that is a size in the vertical direction in the acceleration value distribution map of the plot range D4.

Returning to the description of FIG. 3. The estimation means 23*d* of the control unit 23 estimates a road surface condition of a road surface on which the vehicle 3 traveled on the basis of vibration information measured by the measurement means 23*c*.

For example, the estimation means 23*d* estimates that the larger is a value of the above-mentioned absolute value |A| measured by the measurement means 23*c*, the larger is a degree of deterioration (for example, roughness and the like) of the road surface deterioration section X.

In addition, the estimation means 23*d* estimates that, for example, the larger a value of the above-mentioned absolute value |B| measured by the measurement means 23*c* is, the larger the degree of deterioration (for example, roughness and the like) of the road surface deterioration section X is.

Further, the estimation means 23*d* estimates that, for example, the larger is a value of the above-mentioned absolute value |B/C| measured by the measurement means 23*c*, the more progresses a partial deterioration of the road surface deterioration section X.

Further, the estimation means 23*d* is capable of estimating, for example, a horizontal position of the road surface deterioration section X (relative position in lateral direction of the road surface deterioration section X with respect to the vehicle 3) on the basis of the above-mentioned value of the absolute value |B/C| measured by the measurement means 23*c*.

Further, in a case where a value of a fluctuation of the above-mentioned absolute value |D| measured by the measurement means 23*c* is large, the estimation means 23*d* is capable of estimating that contribution of the degree of deterioration of the road surface deterioration section X to the value of the absolute value |B/C| is more largely affected by the partial deterioration than by the horizontal position of the road surface deterioration section X.

As described up to here, in the embodiment 1, the vibration information on the vehicle 3 is measured on the basis of the distribution of the acceleration of the vehicle 3 in the multiple axes (for example, acceleration value distribution map), and the road surface condition is estimated on the basis of the vibration information on the vehicle 3. Accordingly, it is possible to accurately estimate the road surface condition.

In addition, in the embodiment 1, the estimation means 23*d* may estimate the road surface condition on the basis of a size of the vibration of the vehicle 3 (for example, absolute value |A|, absolute value |B|, and absolute value |D|, and a deviation of a vibration position of the vehicle 3 (for example, absolute value |B/C|), as well as a temporal length of the vibration.

Thus, it is possible to further accurately estimate the road surface condition by estimating the degree of deterioration of the road surface deterioration section X with various parameters.

Further, in the embodiment 1, the measurement means 23*c* may measure the size of the vibration of the vehicle 3 and a deviation of the vibration position of the vehicle 3 on the basis of a shape of the acceleration value distribution map generated by the generation means 23*b*.

Accordingly, it is possible to accurately measure the size of the vibration of the vehicle 3 and the deviation of the vibration position of the vehicle 3. Therefore, according to the embodiment 1, it is possible to further accurately estimate the road surface condition.

In addition, in the embodiment 1, the estimation means 23*d* may estimate undulations of a road surface on the basis of the size of the vibration of the vehicle 3, and estimate a horizontal position of a point at which the road surface condition is damaged in a traveling lane on the basis of the deviation of the vibration position of the vehicle 3.

Accordingly, it is possible to estimate the degree of deterioration of the road surface deterioration section X by the various parameters, and estimate the horizontal position of the road surface deterioration section X. Therefore, according to the embodiment 1, it is possible to further accurately estimate the road surface condition.

In addition, in the embodiment 1, the estimation means 23*d* may directly estimate the road surface condition on the basis of the shape of the acceleration value distribution map generated by the generation means 23*b*. For example, the estimation means 23*d* is capable of estimating whether there is a bump on the road surface or whether there is a crack on the road surface on the basis of the shape of the acceleration value distribution map. Therefore, according to the embodiment 1, it is possible to further accurately estimate the road surface condition.

Further, in the embodiment 1, the acquisition means 23*a* may acquire the travel information from a three axes acceleration sensor 5 located inside the vehicle 3. Thus, since the acceleration value distribution map of the vehicle 3 can be easily generated, it is possible to estimate the road surface condition at a lower cost.

Note that, the three axes acceleration sensor 5 is not limited to a case of being mounted in the vehicle 3, but may be a three axes acceleration sensor mounted in, for example, an information terminal such as a smartphone or the like that is placed in the vehicle 3.

In addition, in the present disclosure, the number of three axes acceleration sensors 5 that measure the acceleration of the vehicle 3 is not limited to one, and may be plural. Accordingly, since it is possible to accurately measure the acceleration of the vehicle 3, it is possible to further accurately estimate the road surface condition.

Returning to the description of FIG. 3. The storing means 23*e* of the control unit 23 associates the positional information of the vehicle 3 acquired by the acquisition means 23*a* with the road surface condition estimated by the estimation means 23*d*, and stores the associated positional information and the road surface condition in the road surface information storage unit 12*b* (see FIG. 2).

Accordingly, since information regarding a place where the road surface condition is poor is stored in the road surface information storage unit 12*b* of the server 2, the information regarding the place where the road surface condition is poor can be utilized in the plurality of vehicles 3 that are connected to the network N. An example of utilization of the road surface condition will be described later.

In addition, in the embodiment 1, the shape or the size of the generated acceleration value distribution map may vary depending on the speed of the vehicle 3, a vehicle type of the vehicle 3, and a type of tires mounted in the vehicle 3 and the like.

Then, in the embodiment 1, the road surface condition may be estimated on the basis of information such as the speed of the vehicle 3, the vehicle type of the vehicle 3, and the type of tires mounted in the vehicle 3 and the like when passing the road surface deterioration section X in addition to the various vibration information described above.

For example, the vehicle 3 may travel on a road surface whose shape of roughness is preliminarily known so as to execute a calibration process on each of the vehicles 3.

Further, the server 2 or the control device 4 generates a learning model having the acceleration value distribution map as input information and the degree of deterioration of the road surface as output information on the basis of a set of acceleration value distribution maps of one of the vehicle 3. Then, the estimation means 23*d* may estimate the degree of deterioration of the road surface by using the learning model in every generation of the acceleration value distribution map.

Further, the server 2 generates a learning model having the acceleration value distribution map as input information and the degree of deterioration of the road surface as output information on the basis of a set of acceleration value distribution maps of a plurality of the vehicles 3 connected to the network N. Then, the estimation means 23*d* may estimate the degree of deterioration of the road surface by using the learning model in every generation of the acceleration value distribution map.

Further, in the embodiment 1, the estimation means 23*d* may generate the acceleration value distribution map per unit time throughout the entire travelling time during traveling, or may generate the acceleration value distribution map from a point of time when the three axes acceleration sensor 5 detects particular acceleration.

<Driving Assistance Process>

Next, details of a driving assistance process according to the embodiment 1 will be explained with reference to FIG. 3 and FIGS. 6 to 9.

The acquisition means 23*a* of the control unit 23 shown in FIG. 3 acquires the travel information of the vehicle 3. As the travel information, the acquisition means 23*a* acquires, for example, the information regarding the acceleration of the vehicle 3 in the front-back direction, the lateral direction, and the vertical direction from the three axes acceleration sensor 5.

Further, as the travel information, the acquisition means 23*a* acquires, for example, the positional information of the vehicle 3 from the GPS sensor 6, and acquires the speed information of the vehicle 3 from the speed sensor 7.

The generation means 23*b* generates an acceleration value distribution map in which the distribution of the acceleration in the three axes in the predetermined unit time is plotted in the three-dimensional coordinate system by using the information regarding the acceleration of the vehicle 3 in the front-back direction, the lateral direction, and the vertical direction acquired by the acquisition means 23*a*.

The measurement means 23*c* measures the vibration information on the vehicle 3 on the basis of the distribution of the acceleration of the vehicle 3 in the multiple axes (for example, acceleration value distribution map generated by generation means 23*b*).

The measurement means 23*c* measures, for example, the size of the vibration of the vehicle 3 (for example, absolute value |A|, absolute value |B|, and absolute value |D|), and the deviation of the vibration position of the vehicle 3 (for example, absolute value |B/C|) as well as the road surface condition estimation process described above.

The specification means 23*g* specifies the information regarding the cargo collapse on the vehicle 3 (that is, cargo collapse information) on the basis of various information. The cargo collapse information may include, for example, a probability that the cargo collapse occurs, or a degree of the cargo collapse occurred.

Note that, in a following explanation, the probability that the cargo collapse occurs, and the degree of the cargo collapse occurred included in the cargo collapse information are comprehensively referred to as "degree of influence given to cargo collapse".

The specification means 23*g* may specify the cargo collapse information of the vehicle 3 by using, for example, the vibration information of the vehicle 3 measured by the measurement means 23*c*.

For example, the specification means 23*g* may specify that the larger is the value of the absolute value |A| (see FIG. 6) of the size in the front-back direction in the acceleration value distribution map is, the larger is the degree of the influence given to the cargo collapse. In this case, the specification means 23*g* may specify the degree of the influence given to the cargo collapse taking duration of vibration in the vehicle 3 in the front-back direction into account.

Note that the specification means 23*g* may provide a dead zone with respect to the vibration in the vehicle 3 in the front-back direction. Accordingly, it is possible to accurately specify the degree of the influence given to the cargo collapse.

Further, the specification means 23*g* may specify that, for example, the larger is the value of the absolute value |B| (see FIG. 6) of the size in the lateral direction in the acceleration value distribution map is, the larger is the degree of the influence given to the cargo collapse. In this case, the specification means 23*g* may specify the degree of the influence given to the cargo collapse taking duration of vibration in the vehicle 3 in the lateral direction into account.

Further, the specification means 23*g* may specify, for example, that the larger is the value of the absolute value |B/C| described above (see FIG. 6) that indicates the deviation of the vibration position of the vehicle 3, the larger is the degree of the influence given to the cargo collapse. In this case, the specification means 23*g* may specify the degree of the influence given to the cargo collapse taking duration of the deviation of the vibration position of the vehicle 3 into account.

Figure 7:
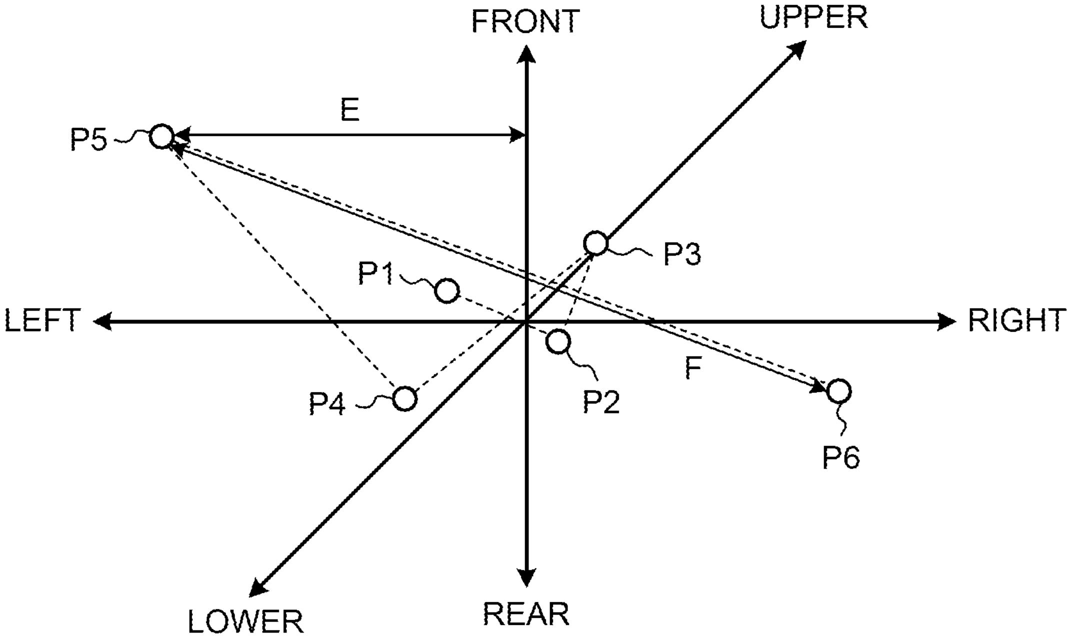
FIG. 7 is a drawing to explain an example of a driving assistance process according to the embodiment 1.

Further, the specification means 23*g* may specify the cargo collapse information of the vehicle 3 using information that is different from the vibration information measured by the measurement means 23*c*. FIG. 7 is a drawing to explain an example of the driving assistance process according to the embodiment 1, and in the drawing, transition of each acceleration at each time is plotted in the three-dimensional coordinate system in which the distribution of the acceleration in the three axes is plotted.

Specifically, in FIG. 7, first, the distribution of the acceleration in the three axes is plotted at a position of the plot P1, and the following distributions of the acceleration in the three axes are plotted at the plot P2, the plot P3, the plot P4, the plot P5, and the plot P6 in this order.

In this case, the extraction means 23*f* of the control unit 23 extracts, for example, information regarding a lateral direction component of the acceleration of the vehicle 3 from transition of acceleration of the vehicle 3 in the three axes. For example, the extraction means 23*f* extracts a value of an absolute value |E| of a size of a horizontal direction component in each plot (for example, plot P5) shown in FIG. 7.

Then, the specification means 23*g* specifies that the larger is the value of the absolute value |E| of the size of the horizontal direction component, the larger is the degree of the influence given to the cargo collapse.

Further, the extraction means 23*f* may extract a value in which a distance between the plot P5 and the origin is taken into account in the absolute value |E| of the size of the horizontal direction component in each plot (for example, plot P5) shown in FIG. 7.

Then, the specification means 23*g* specifies that the larger is the value of the absolute value |E| of the size of the horizontal direction component in which the distance between the plot P5 and the origin is taken into account, the larger is the degree of the influence given to the cargo collapse.

Further, the extraction means 23*f* may extract, for example, a value of an absolute value |F| of a deviation in each plot shown in FIG. 7 (difference between each plot and plot immediately before, for example, difference between plot P5 that is immediately before plot P6 and plot P6).

Then, the specification means 23*g* specifies that the larger is the value of the absolute value |F| of the deviation, the larger is the degree of the influence given to the cargo collapse.

Further, in the embodiment 1, an acceleration value distribution map in one trip of the vehicle 3 may be generated, and the degree of the influence given to the cargo collapse may be specified on the basis of the acceleration value distribution map generated in the one trip.

Figure 8:
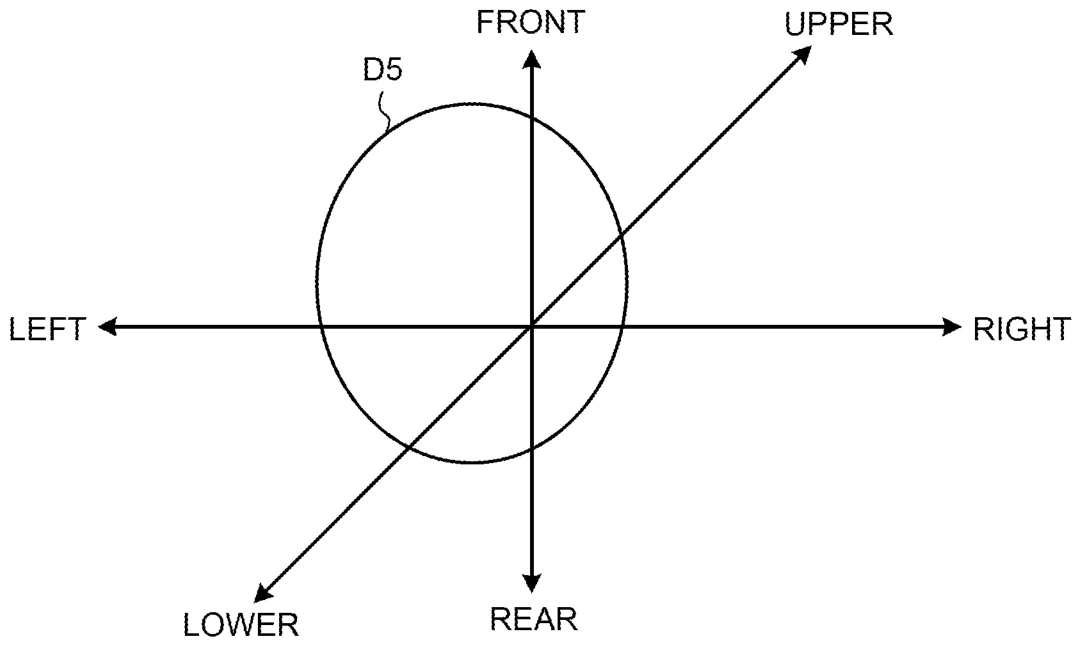
FIG. 8 is a drawing to explain an example of a driving assistance process according to the embodiment 1.

FIG. 8 is a drawing to explain the example of the driving assistance process according to the embodiment 1, and is the drawing showing an example of the acceleration value distribution map in the one trip of the vehicle 3.

The acceleration value distribution map (plot range D5) in the one trip of the vehicle 3 shown in FIG. 8 is generated by the generation means 23*b* of the control unit 23. Then, the extraction means 23*f* extracts a degree of distortion (for example, deviation with respect to origin) of the plot range D5.

Then, the specification means 23*g* specifies that the larger is the degree of distortion of the acceleration value distribution map in the one trip, the larger is the degree of the influence given to the cargo collapse.

Figure 9:
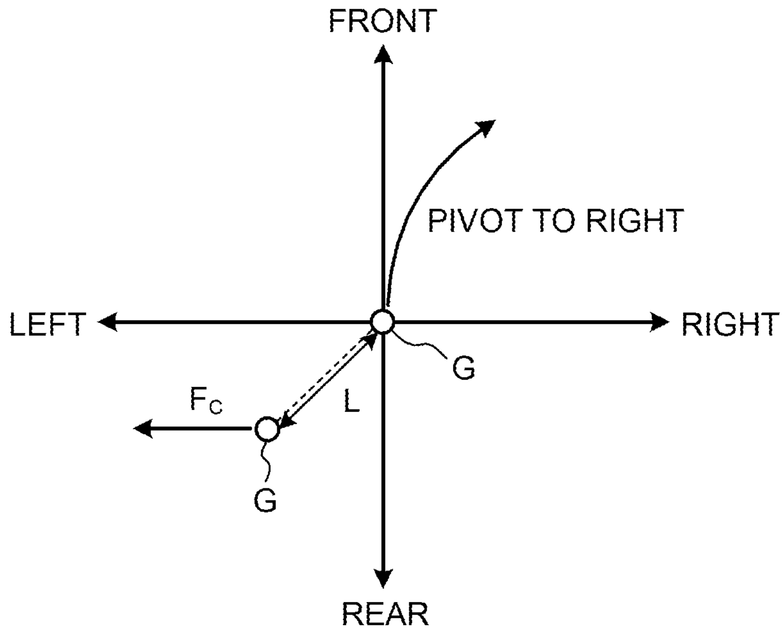
FIG. 9 is a drawing to explain an example of a driving assistance process according to the embodiment 1.

In addition, in the embodiment 1, a moment to be added to a cargo loaded in the vehicle 3 may be extracted from the travel information of the vehicle 3 acquired by the acquisition means 23*a*, and the degree of the influence given to the cargo collapse may be specified on the basis of the moment to be added to the cargo. FIG. 9 is a drawing to explain an example of the driving assistance process according to the embodiment 1, and the drawing to explain the moment to be added to the cargo.

In the example of FIG. 9, a position of a gravity center G of the cargo in an initial stage corresponds to the origin (for example, gravity position of vehicle 3). Next, a case that the vehicle 3 pivots to the right and the gravity center G of the cargo is moving from the origin to the left rear is considered.

In this case, the extraction means 23*f* can extract a moment M to be added to the cargo based on a following equation (1).

$$M \propto F_C \times L \quad (1)$$

Fc: centrifugal force

L: distance between origin and gravity center G

Then, the specification means 23*g* specifies that the larger is a value of the moment M to be added to the cargo (in a case where L is large, that is, a difference between the initial values of the gravity center is large, and/or in a case where a centrifugal force of F is large, that is, speed is high or traveling on a sharp curve), the larger is the degree of the influence given to the cargo collapse. Note that the position of the gravity center G of the cargo can be calculated by acceleration, angular velocity, or angular acceleration or the like detected by the three axes acceleration sensor 5.

Returning to the description of FIG. 3. The presentation means 23*h* of the control unit 23 presents the cargo collapse information of the vehicle 3 specified by the specification means 23*g* to a driver of the vehicle 3. For example, the presentation means 23*h* presents the cargo collapse information on the vehicle 3 to the driver by displaying the cargo collapse information of the vehicle 3 on the display unit 8.

For example, the presentation means 23*h* presents to the driver that possibility of the cargo collapse occurrence is high in a case where the degree of the influence given to the cargo collapse is larger than a predetermined threshold. Accordingly, the control device 4 is capable of reducing the driving that may easily cause the cargo collapse.

Further, the presentation means 23*h* may present, to the driver, a degree of the cargo collapse that occurred in a case where, for example, the degree of the influence given to the cargo collapse is larger than a predetermined threshold. Accordingly, also, the control device 4 can reduce the driving that may increase the degree of the cargo collapse.

Therefore, according to the embodiment 1, it is possible to reduce the cargo collapse on the vehicle 3.

Further, in the embodiment 1, out of various elements described above (for example, absolute value |A|, absolute value |B|, absolute value |B/C|, absolute value |E|, absolute value |E|, and moment M), an element in which the degree of the influence given to the cargo collapse is large may be individually presented to the driver.

Further, in the embodiment 1, the above-mentioned various elements (for example, absolute value |A|, absolute value |B|, absolute value |B/C|, absolute value |E|, absolute value |E|, and moment M) may be comprehensively taken into account in the magnitude of the degree of the influence to present the magnitude of the degree of the influence to the driver.

Further, in the embodiment 1, information on a point at which the degree of the influence given to the cargo collapse is large may be accumulated in the server 2. For example, the storing means 23*e* associates the positional information of the vehicle 3 acquired by the acquisition means 23*a* with the cargo collapse information specified by the specification means 23*g*, and stores the positional information and the cargo collapse information in the cargo collapse information storage unit 12*c* of the server 2.

Accordingly, since information regarding a place where the cargo collapse may easily occur is stored in the cargo collapse information storage unit 12*c* of the server 2, the information regarding the place where the cargo collapse may easily occur can be utilized in a plurality of vehicles 3 connected to the network N.

For example, the control device 4 may present a guide of a route on which the vehicle 3 plans to travel to the driver on the basis of information stored in the road surface information storage unit 12*b* and the cargo collapse information storage unit 12*c* of the server 2.

Specifically, the control device 4 may present, to the driver, the guide of a route to avoid, for example, a place where the road surface condition is poor which is stored in the road surface information storage unit 12*b*, and a place where the cargo collapse may easily occur which is stored in the cargo collapse information storage unit 12*c* (for example, a place where a degree of the influence given to cargo collapse is larger than a predetermined threshold).

Accordingly, it is possible to prevent the vehicle 3 from entering the place where the road surface condition is poor (for example, place where large irregularities are generated on the road surface or the like) or the place where the cargo collapse easily occurs (for example, curve having small curvature or the like) beforehand. Therefore, according to the embodiment 1, it is possible to effectively reduce the cargo collapse on the vehicle 3.

In addition, in a case where the degree of the influence given to the cargo collapse becomes larger than a predetermined threshold while traveling on a road surface regarding which the road surface condition thereof is known to be good in advance, the control device 4 estimates that an increase in the degree of the influence results not from the road surface condition but from a way the driver drives by referring to the road surface information storage unit 12*b*.

Then, in this case, the presentation means 23*h* may present (advise), to the driver, a driving method for reducing the degree of the influence given to the cargo collapse. For example, in a case where the degree of distortion of the acceleration value distribution map in the one trip shown in FIG. 8 is large, the presentation means 23*h* may present, to the driver, the driving method to reduce the degree of distortion of the acceleration value distribution map when the driver is resting after the one trip is over.

Accordingly, the control device 4 is capable of reducing the driving that may easily cause the cargo collapse. Therefore, according to the embodiment 1, it is possible to reduce the cargo collapse on the vehicle 3.

In addition, in the embodiment 1, in a case where the position of the gravity center G of the cargo is gradually moving, a guidance may be presented to the driver. In addition, in a case where it is assumed that balance of the cargo is significantly lost, the presentation means 23*h* may present the driver an advice to temporarily stop the vehicle 3 so as to check the cargo.

Embodiment 2

Next, a configuration of a vehicle 3A according to the embodiment 2 will be explained with reference to FIG. 10.

Figure 10:
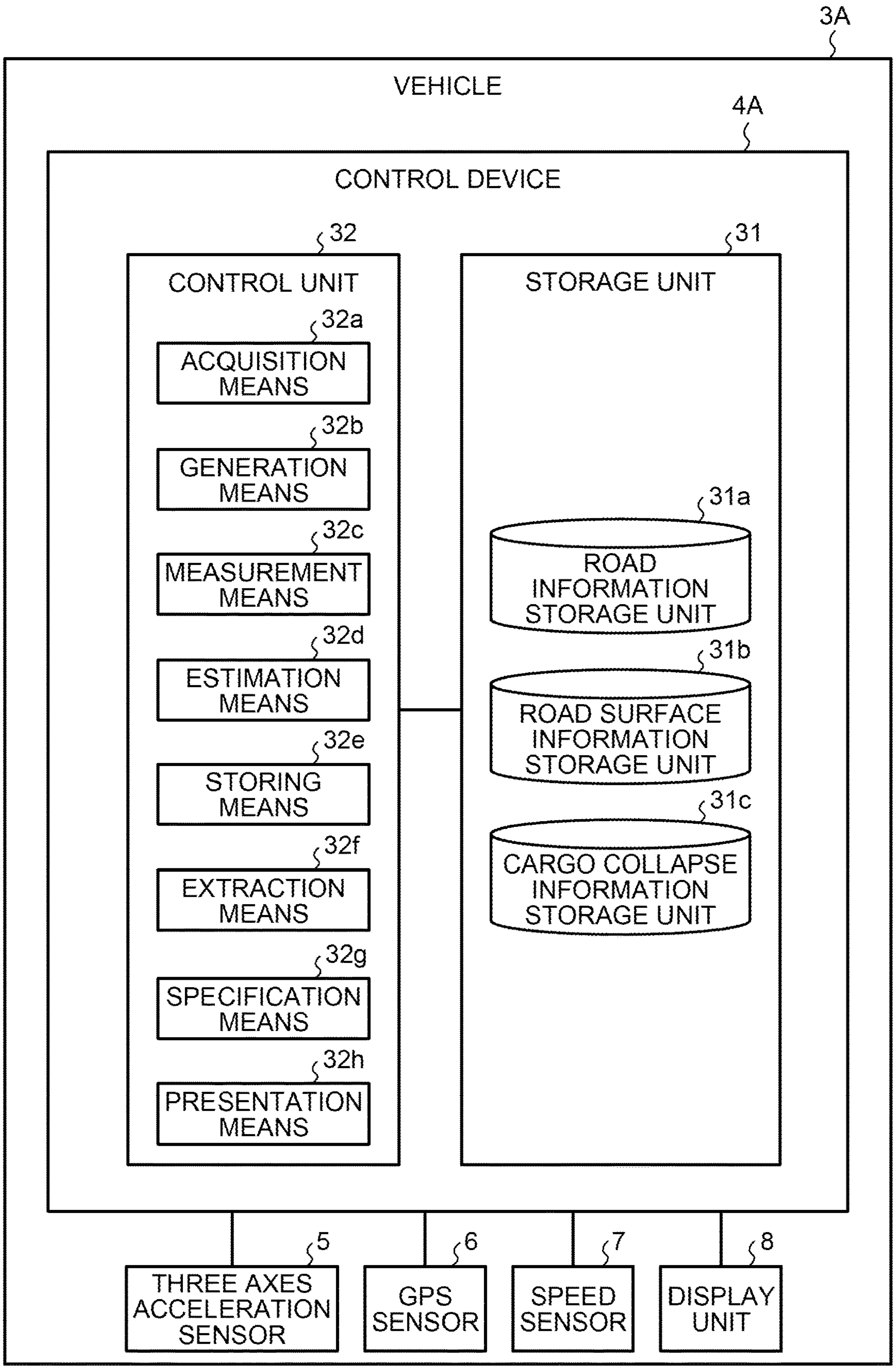
FIG. 10 is an explanatory drawing showing an example of a configuration of a vehicle according to the embodiment 2.

FIG. 10 is an explanatory drawing showing an example of the configuration of the vehicle 3A according to the embodiment 2. The vehicle 3A according to the embodiment 2 is a stand-alone type vehicle that is not connected to a network N (see FIG. 1).

As shown in FIG. 10, the vehicle 3A includes a control device 4A, a three axes acceleration sensor 5, a GPS sensor 6, a speed sensor 7, and a display unit 8. The control device 4A is another example of a road surface condition estimation device, and another example of a driving assistance device.

The three axes acceleration sensor 5 is, for example, a sensor that detects acceleration in each direction of the X axis, the Y axis, and the Z axis so as to supply a detected signal thereof to the control device 4A. Note that the three axes acceleration sensor 5 may further detect angular velocity and angular acceleration of an operation of the vehicle 3A.

The GPS sensor 6 receives radio waves carrying downlink data including measurement data from a plurality of GPS satellites and supplies the measurement data to control device 4A. The control device 4A is capable of detecting an absolute position of the vehicle 3A from positional information (for example, latitude and longitude) included in the measurement.

The speed sensor 7 is, for example, a sensor to detect speed of the vehicle 3A, and supplies a detected signal thereof to the control device 4A. The display unit 8 is provided to, for example, an instrumental panel of the vehicle 3A, and further includes a liquid crystal display, an organic EL element, and the like.

As shown in FIG. 10, the control device 4A includes a storage unit 31, and a control unit 32. The storage unit 31 is implemented by, for example, a semiconductor memory element such as a RAM, a Flash Memory, or the like, or a storage device such as a hard disk, an optical disk, or the like. As shown in FIG. 10, the storage unit 31 includes a road information storage unit 31*a*, a road surface information storage unit 31*b*, and a cargo collapse information storage unit 31*c*.

The road information storage unit 31*a* stores therein road position information indicating a position of a road, for example, map information. The road surface information storage unit 31*b* stores therein road surface information of the road. The cargo collapse information storage unit 31*c* stores therein the cargo collapse information.

Note that since the road information storage unit 31*a*, the road surface information storage unit 31*b*, and the cargo collapse information storage unit 31*c* have configurations that are respectively similar to those of a road information storage unit 12*a*, a road surface information storage unit 12*b*, and a cargo collapse information storage unit 12*c* of the embodiment 1 shown in FIG. 2, a detailed explanation thereof will be omitted.

The control unit 32 may be a controller to be realized in a case where various programs stored in the storage device inside the control device 4A are executed by, for example, a CPU or an MPU or the like, having the RAM as a working area. Further, the control unit 32 may be, for example, a controller to be realized by an integrated circuit such as an ASIC or an FPGA, or the like.

As shown in FIG. 10, the control unit 32 includes an acquisition means 32*a*, a generation means 32*b*, a measurement means 32*c*, an estimation means 32*d*, a storing means 32*e*, an extraction means 32*f*, a specification means 32*g*, and a presentation means 32*h*, and implements or executes functions and operations of various processes to be explained below. Note that, an internal configuration of the control unit 32 is not limited to a configuration shown in FIG. 10, and may be another configuration as long as the configuration executes the various processes to be explained below.

The acquisition means 32*a* acquires travel information of the vehicle 3A. As the travel information, the acquisition means 32*a* acquires information regarding acceleration of the vehicle 3A in the front-back direction, the lateral direction, and the vertical direction from, for example, the three axes acceleration sensor 5.

In addition, as the travel information, the acquisition means 32*a* acquires positional information of the vehicle 3A from the GPS sensor 6, and acquires speed information of the vehicle 3A from the speed sensor 7.

The generation means 32*b* generates an acceleration value distribution map in which a distribution of the acceleration in three axes in predetermined unit time is plotted in a three-dimensional coordinate system by using information regarding the acceleration of the vehicle 3A in the front-back direction, the lateral direction, and the vertical direction acquired by the acquisition means 32*a*.

The measurement means 32*c* measures vibration information on the vehicle 3A on the basis of a distribution of the acceleration of the vehicle 3A in multiple axes (for example, acceleration value distribution map generated by generation means 32*b*). The estimation means 32*d* estimates a road surface condition of a road surface on which the vehicle 3A traveled on the basis of the vibration information measured by the measurement means 32*c*.

The storing means 32*e* associates the positional information of the vehicle 3A acquired by the acquisition means 32*a* with the road surface condition estimated by the estimation means 32*d*, and further stores the associated positional information and the road surface condition in the road surface information storage unit 31*b* of the storage unit 31.

Note that, since the acquisition means 32*a*, the generation means 32*b*, the measurement means 32*c*, the estimation means 32*d*, and the storing means 32*e* have configurations that are respectively similar to those of an acquisition means 23*a*, a generation means 23*b*, a measurement means 23*c*, an estimation means 23*d*, and a storing means 23*e* of the embodiment 1 shown in FIG. 3, a detailed explanation thereof will be omitted.

Thus, in the embodiment 2, as is the case with the embodiment 1 described above, the vibration information of the vehicle 3A is measured on the basis of the distribution of the acceleration of the vehicle 3A in the multiple axes (for example, acceleration value distribution map), and the road surface condition is estimated on the basis of the vibration information of the vehicle 3A. Accordingly, it is possible to accurately estimate the road surface condition.

In addition, in the embodiment 2, the estimation means 32*d* may estimate the road surface condition on the basis of a size of the vibration of the vehicle 3A (for example, absolute value $|A|$, absolute value $|B|$, and absolute value $|D|$), and a deviation of a vibration position of the vehicle 3A (for example, absolute value $|B/C|$).

Thus, it is possible to further accurately estimate the road surface condition by estimating the degree of deterioration of the road surface deterioration section X with various parameters.

Further, in the embodiment 2, the measurement means 32*c* may measure the size of the vibration of the vehicle 3A and a deviation of the vibration position of the vehicle 3A on the basis of a shape of the acceleration value distribution map generated by the generation means 32*b*.

Accordingly, it is possible to accurately measure the size of the vibration of the vehicle 3A and the deviation of the vibration position of the vehicle 3A. Therefore, according to the embodiment 2, it is possible to further accurately estimate the road surface condition.

In addition, in the embodiment 2, the estimation means 32*d* may estimate undulation of a face of a road surface on the basis of the size of the vibration of the vehicle 3A, and estimate the horizontal position of a point at which the road surface condition is damaged in a traveling lane on the basis of the deviation of the vibration position of the vehicle 3A.

Accordingly, it is possible to estimate the degree of deterioration of the road surface deterioration section X by various parameters, and it is also possible to estimate the horizontal position of the road surface deterioration section X. Therefore, according to the embodiment 2, it is possible to further accurately estimate the road surface condition.

In addition, in the embodiment 2, the estimation means 32*d* may directly estimate the road surface condition on the basis of the shape of the acceleration value distribution map generated by the generation means 32*b*. For example, the estimation means 32*d* can estimate whether there is an uneven step on the road surface or whether there are cracks on the road surface on the basis of the shape of the acceleration value distribution map. Therefore, according to the embodiment 2, it is possible to further accurately estimate the road surface condition.

Further, in the embodiment 2, the acquisition means 32*a* may acquire the travel information from a three axes acceleration sensor 5 located inside the vehicle 3A. Thus, since the acceleration value distribution map of the vehicle 3A can be easily generated, it is possible to estimate the road surface condition at a lower cost.

Note that, the three axes acceleration sensor 5 is not limited to the one installed in the vehicle 3A, but may be a three axes acceleration sensor installed in, for example, an information terminal such as a smartphone or the like, and placed in the vehicle 3A.

In addition, in the present disclosure, a number of three axes acceleration sensors 5 that measure the acceleration of the vehicle 3A is not limited to one, and may be plural. Accordingly, since it is possible to accurately measure the acceleration of the vehicle 3A, it is possible to further accurately estimate the road surface condition.

Further, in the embodiment 2, the storing means 32*e* may associate the positional information of the vehicle 3A acquired by the acquisition means 32*a* with the road surface condition estimated by the estimation means 32*d*, and store the positional information and the road surface condition in the road surface information storage unit 31*b* of the storage unit 31.

Accordingly, since a place where the road surface condition is poor is stored in the road surface information storage unit 31*b*, the information regarding the road surface condition estimated by the vehicle 3A can be utilized when the vehicle 3A travels next time and thereafter.

In addition, in the embodiment 2, as is the case with the embodiment 1 described above, there may be a case where the shape and the size of the generated acceleration value distribution map vary depending on the speed of the vehicle 3A, a vehicle type of the vehicle 3A, and a type of tires mounted in the vehicle 3A or the like.

Then, in the embodiment 2, the road surface condition may be estimated on the basis of information such as the speed of the vehicle 3A, the vehicle type of the vehicle 3A, and the type of tires mounted in the vehicle 3A or the like when passing the road surface deterioration section X in addition to the various vibration information described above.

For example, by causing the vehicle 3A to travel on a road surface a shape of irregularities thereof is known in advance, a calibration process may be performed on the vehicle 3A.

Further, the control device 4A generates a learning model having the acceleration value distribution map as input information and the degree of deterioration of the road surface as output information on the basis of a set of the acceleration value distribution maps of the vehicle 3A. Then, the estimation means 32*d* may estimate the degree of deterioration of the road surface by using the learning model in every generation of the acceleration value distribution map.

Further, in the embodiment 2, the generation means 32*b* may generate the acceleration value distribution map per unit time throughout the entire travelling time during traveling, or may generate the acceleration value distribution map from a point of time when the three axes acceleration sensor 5 detects particular acceleration.

The extraction means 32*f* extracts information regarding a lateral direction component of the acceleration of the vehicle 3A and the like from, for example, transition of acceleration in the three axes of the vehicle 3A. The specification means 32*g* specifies the cargo collapse information of the vehicle 3A on the basis of various information.

The presentation means 32*h* presents the cargo collapse information of the vehicle 3A specified by the specification means 32*g* to a driver of the vehicle 3A. For example, the presentation means 32*h* presents the cargo collapse information of the vehicle 3A to the driver of the vehicle 3A by displaying the cargo collapse information of the vehicle 3A on the display unit 8.

Note that, since the extraction means 32*f*, the specification means 32*g*, and the presentation means 32*h* have configurations that are similar to those of the extraction means 23*f*, the specification means 23*g*, and the presentation means 23*h* of the embodiment 1 shown in FIG. 3 respectively, a detailed explanation thereof will be omitted.

Thus, in the embodiment 2, as is the case with the embodiment 1 described above, the cargo collapse information of the vehicle 3A specified by the specification means 32*g* is presented to the driver of the vehicle 3A.

For example, the presentation means 32*h* presents to the driver that possibility of the cargo collapse occurrence is high in a case where the degree of the influence given to the cargo collapse is larger than a predetermined threshold. Accordingly, the control device 4A can reduce the driving that may cause the cargo collapse easily.

Further, the presentation means 32*h* may present degree of the cargo collapse that occurred to the driver in a case where, for example, the degree of the influence given to the cargo collapse is larger than a predetermined threshold. Thereby, also, the control device 4A can reduce the driving that may increase the degree of the cargo collapse.

Therefore, according to the embodiment 2, it is possible to reduce the cargo collapse on the vehicle 3A.

Further, in the embodiment 2, out of various elements indicated in the embodiment 1 described above (for example, absolute value |A|, absolute value |B|, absolute value |B/C|, absolute value |E|, absolute value |F|, and moment M), an element that makes the degree of the influence given to the cargo collapse large may be individually presented to the driver.

In addition, in the embodiment 2, the above-mentioned various elements (for example, absolute value |A|, absolute value |B|, absolute value |B/C|, absolute value |E|, absolute value |F|, and moment M) may be comprehensively taken into account in the magnitude of the degree of the influence to present the magnitude of the degree of the influence to the driver.

Further, in the embodiment 2, information of a point at which the degree of the influence given to the cargo collapse is large may be stored in the storage unit 31. For example, the storing means 32*e* associates the positional information of the vehicle 3A acquired by the acquisition means 32*a* with the cargo collapse information specified by the specification means 32*g*, and stores the associated positional information and the cargo collapse information in the cargo collapse information storage unit 31*c* of the storage unit 31.

Accordingly, since information regarding a place where the cargo collapse may easily occur is stored in the road surface information storage unit 31*b*, the information regarding the place where the cargo collapse may easily occur can be utilized when the vehicle 3A travels next time and thereafter.

For example, the control device 4A may present, to the driver, a guide of a route on which the vehicle 3A plans to travel on the basis of information stored in the road surface information storage unit 31*b* and the cargo collapse information storage unit 31*c* of the storage unit 31.

Specifically, the control device 4A may present, to the driver, the guide of a route to avoid, for example, a place where the road surface condition is poor which is stored in the road surface information storage unit 31*b*, and a place where the cargo collapse may easily occur which is stored in the cargo collapse information storage unit 31*c* (for example, place where the degree of influence given to the cargo collapse is larger than a predetermined threshold).

Accordingly, it is possible to prevent the vehicle 3A from entering the place where the road surface condition is poor (for example, a place where large irregularities are generated on the road surface or the like) or the place where the cargo collapse may easily occur (for example, curve having small curvature or the like). Therefore, according to the embodiment 2, it is possible to effectively reduce the cargo collapse on the vehicle 3A.

In addition, in a case where the degree of the influence given to the cargo collapse becomes larger than a predetermined threshold while traveling on a road surface regarding which the road surface condition thereof is known to be good in advance, the control device 4A may estimate that an increase of the degree of the influence results not from the road surface condition but from a way the driver drives by referring to the road surface information storage unit 31*b*.

Then, in this case, the presentation means 32*h* may present (advise), to the driver, a driving method to reduce the degree of the influence given to the cargo collapse. For example, in a case where the degree of distortion of the acceleration value distribution map in the one trip is large, the presentation means 32*h* may present, to the driver, the driving method to reduce the degree of distortion of the acceleration value distribution map when the driver is resting after the one trip is over.

Accordingly, the control device 4A can reduce the driving that may cause the cargo collapse easily. Therefore, according to the embodiment 2, it is possible to reduce the cargo collapse on the vehicle 3A.

In addition, in the embodiment 2, in a case where the position of a gravity center G of the cargo is gradually moving, a guidance may be presented to the driver. In addition, in a case where it is assumed that balance of the cargo is significantly lost, the presentation means 32*h* may present the driver to stop the vehicle 3A temporarily and check the cargo.

<Procedures of Processes>

Figure 11:
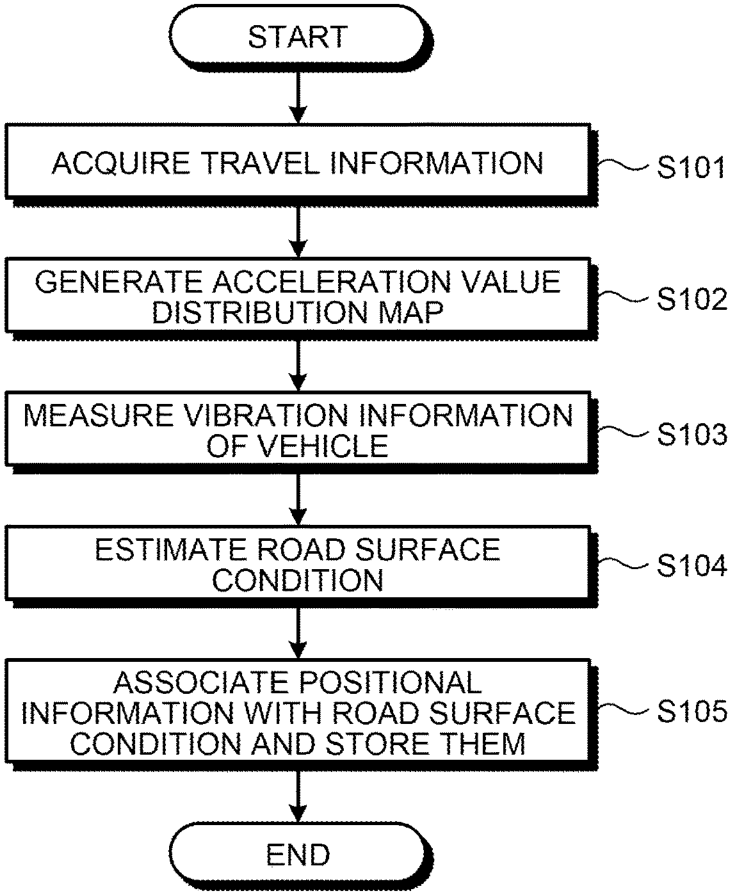
FIG. 11 is a flowchart showing a procedure of a road surface condition estimation process according to the embodiment 1.

Next, details of procedures of various processes according to the embodiment 1 will be explained with reference to FIG. 11 and FIG. 12. FIG. 11 is a flowchart showing a procedure of a road surface condition estimation process according to the embodiment 1.

First, the acquisition means 23*a* acquires the travel information of vehicles 3 (step S101). As the travel information, the acquisition means 23*a* acquires, for example, information regarding acceleration of the vehicle 3 in the front-back direction, the lateral direction, and the vertical direction from the three axes acceleration sensor 5.

Next, the generation means 23*b* generates the acceleration value distribution map in which the distribution of the acceleration in the three axes in the predetermined unit time is plotted in the three-dimensional coordinate system by using the information regarding the acceleration of the vehicle 3 in the front-back direction, the lateral direction, and the vertical direction acquired by the acquisition means 23*a* (step S102).

Next, the measurement means 23*c* measures vibration information of the vehicle 3 on the basis of a distribution of the acceleration of the vehicle 3 in the multiple axes (for example, acceleration value distribution map generated by generation means 23*b*) (step S103).

Next, the estimation means 23*d* estimates a road surface condition of a road surface on which the vehicle 3 traveled on the basis of vibration information measured by the measurement means 23*c* (step S104).

Finally, the storing means 23*e* associates positional information of the vehicle 3 acquired by the acquisition means 23*a* with a road surface condition estimated by the estimation means 23*d*, and stores the associated positional information and the road surface condition in the road surface information storage unit 12*b* of the server 2 (step S105), and ends a series of road surface condition estimation processes.

Figure 12:
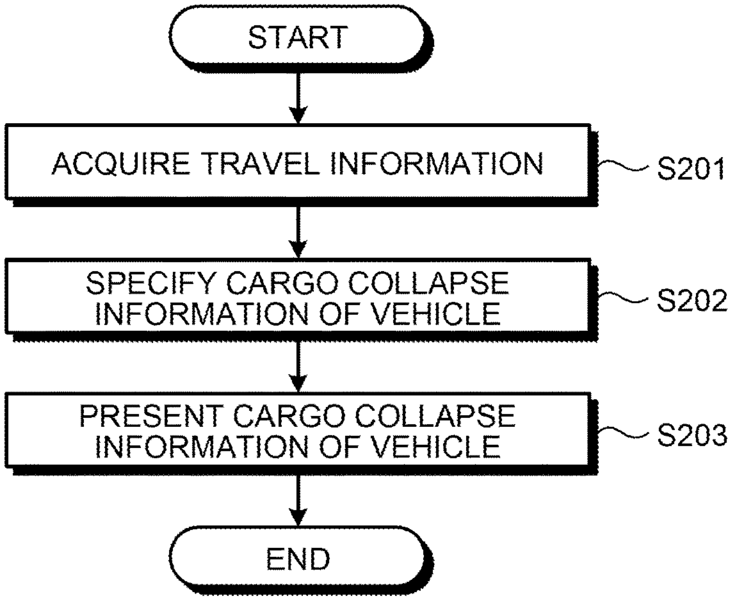
FIG. 12 is a flowchart showing a procedure of a driving assistance process according to the embodiment 1.

FIG. 12 is a flowchart showing a procedure of the driving assistance process according to the embodiment 1. First, the acquisition means 23*a* acquires the travel information of the vehicle 3 (step S201). As the travel information, the acquisition means 23*a* acquires, for example, the information regarding the acceleration of the vehicle 3 in the front-back direction, the lateral direction, and the vertical direction from the three axes acceleration sensor 5.

Next, the specification means 23*g* specifies the cargo collapse information of the vehicle 3 on the basis of the distribution of the acceleration of the vehicle 3 in the multiple axes on the basis of the travel information acquired by the acquisition means 23*a* (step S202).

The specification means 23*g* specifies the cargo collapse information of the vehicle 3 on the basis of, for example, the vibration information of the vehicle 3 measured by the measurement means 23*c*, or various information extracted by the extraction means 23*f* (absolute value |E| or absolute value |F| or the like described above).

Finally, the presentation means 23*h* presents the cargo collapse information of the vehicle 3 specified by the specification means 23*g* to the driver of the vehicle 3 (step S203), and ends a series of driving assistance processes.

Although the embodiments of the present invention have been described above, the present invention is not limited to the aforementioned embodiments, but various changes can be made unless the changes otherwise depart from the spirit of the present invention. For example, in the embodiment described above, various processes that are implemented on the vehicle 3 are indicated, however, an object of the implementation of the present disclosure is applicable not only to a vehicle but also to various moving bodies (for example, motorcycle, train or the like).

In addition, in the embodiments described above, an example of presenting the cargo collapse information to the driver of the vehicle 3 by the presentation means 23*h* is indicated, however, an object to which the presentation means 23*h* presents the cargo collapse information is not limited to the driver of the vehicle 3, but may be a driver of another vehicle 3 or a manager of the server 2 or the like.

Further, in the embodiments described above, the acceleration value distribution map that is a drawing in which the distribution of the acceleration in the three axes in the predetermined unit time is plotted in the three-dimensional coordinate system is generated by the three axes acceleration sensor 5, and an example of implementing a road surface condition estimation process or the driving assistance process is indicated on the basis of the acceleration value distribution map.

However, the embodiments described above are not limited to the example, and the acceleration value distribution map that is a drawing in which a distribution of the acceleration in two axes in the predetermined unit time is plotted in a two-dimensional coordinate system may be generated by using, for example, acceleration of two axes in the X axis direction and the Y axis direction measured by an acceleration sensor, and the road surface condition estimation process or the driving assistance process may be implemented on the basis of the acceleration value distribution map.

A further effect or a modification example can be easily derived by a person skilled in the art. Therefore, a broader aspect of the present invention shown and described as above is not limited to specific details and representative embodiments. Therefore, various changes can be made without departing from the spirit and scope of a comprehensive concept of the invention defined by attached claims and equivalents thereof.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

The invention claimed is:

1. A driving assistance device for a moving body, comprising:
- a memory; and
- a processor connected to the memory and that:
  - acquires travel information including acceleration of the moving body; and
  - presents, to the moving body, information regarding cargo collapse on the moving body that is specified on a basis of a distribution of an acceleration of the moving body in multiple axes in a predetermined unit time on a basis of the travel information,
- wherein the processor further;
  - extracts information regarding a lateral direction component of the acceleration of the moving body in which weighting is performed in a front-back direction component of the acceleration of the moving body from the distribution of the acceleration of the moving body in the multiple axes in the predetermined unit time on the basis of the travel information; and
  - specifies the information regarding the cargo collapse on the moving body on a basis of the extracted information regarding the lateral direction component of the acceleration of the moving body in which weighting is performed in the front-back direction component of the acceleration of the moving body.

2. The driving assistance device according to claim 1, wherein:
- the processor further extracts information regarding a deviation of the acceleration of the moving body in which time sequence information is taken into account from the distribution of the acceleration of the moving body in the multiple axes in the predetermined unit time on the basis of the travel information; and
- specifies the information regarding the cargo collapse on the moving body on a basis of the extracted information regarding the deviation of the acceleration of the moving body in which the time sequence information is taken into account.

3. The driving assistance device according to claim 1, wherein:
- the processor further extracts information regarding a degree of distortion of the acceleration of the moving body at a most recent predetermined time from the distribution of the acceleration of the moving body in the multiple axes in the predetermined unit time on the basis of the travel information; and
- specifies the information regarding the cargo collapse on the moving body on a basis of the extracted information regarding the degree of the distortion of the acceleration of the moving body at the most recent predetermined time.

4. The driving assistance device according to claim 1, wherein:
- the processor further extracts information regarding a moment to be added to a cargo loaded on the moving body from the travel information; and
- specifies the information regarding the cargo collapse on the moving body on a basis of the extracted information regarding the moment to be added to the cargo loaded on the moving body.

5. The driving assistance device according to claim 1,
- wherein the processor acquires the travel information from a three axes acceleration sensor located inside the moving body.

6. A driving assistance method executed by a driving assistance device, the method comprising:
- acquiring travel information including acceleration of a moving body;
- presenting, to the moving body, information regarding a cargo collapse on the moving body to be specified on a basis of a distribution of an acceleration of the moving body in multiple axes in a predetermined unit time on a basis of the acquired travel information;
- extracting information regarding a lateral direction component of the acceleration of the moving body in which weighting is performed in a front-back direction component of the acceleration of the moving body from the distribution of the acceleration of the moving body in the multiple axes in the predetermined unit time on the basis of the acquired travel information; and
- specifying the information regarding the cargo collapse on the moving body on a basis of the extracted information regarding the lateral direction component of the acceleration of the moving body in which weighting is performed in the front-back direction component of the acceleration of the moving body.

7. A storage medium storing a program causing a processor to implement:

acquiring travel information including acceleration of a moving body;

presenting, to the moving body, information regarding cargo collapse on the moving body that is specified on the basis of a distribution of the acceleration of the moving body in multiple axes in a predetermined unit time on a basis of the acquired travel information;

extracting information regarding a lateral direction component of the acceleration of the moving body in which weighting is performed in a front-back direction component of the acceleration of the moving body from the distribution of the acceleration of the moving body in the multiple axes in the predetermined unit time on the basis of the acquired travel information; and specifying the information regarding the cargo collapse on the moving body on a basis of the extracted information regarding the lateral direction component of the acceleration of the moving body in which weighting is performed in the front-back direction component of the acceleration of the moving body.

8. The driving assistance device according to claim 1, wherein the processor presents, to the moving body, information regarding cargo collapse on the moving body that is specified only on the basis of the distribution of the acceleration of the moving body in the multiple axes in the predetermined unit time on the basis of the travel information.

* * * * *